United States Patent [19]
Koehnk et al.

[11] Patent Number: 5,324,501
[45] Date of Patent: Jun. 28, 1994

[54] METHOD FOR THE PREPARATION OF LOW-CHLORIDE PLASTER PRODUCTS FROM CALCIUM-CONTAINING RESIDUES OF FLUE-GAS PURIFICATION PLANTS

[75] Inventors: Diethel M. Koehnk, Bergkamen-Rünthe; Hubert Bings, Lünen, both of Fed. Rep. of Germany

[73] Assignee: A.I.R. Lippewerk Recycling GmbH, Lunen, Fed. Rep. of Germany

[21] Appl. No.: 845,731

[22] Filed: Mar. 2, 1992

Related U.S. Application Data

[63] Continuation of Ser. No. 514,004, Apr. 25, 1990, abandoned.

[30] Foreign Application Priority Data

Apr. 26, 1989 [DE] Fed. Rep. of Germany ..... 39138222

[51] Int. Cl.$^5$ .................. C01F 11/46; C01B 7/07; C01B 11/26
[52] U.S. Cl. .................. 423/555; 423/170; 423/178; 423/488; 106/772; 106/786
[58] Field of Search .......... 423/170, 162, 178, 481, 423/488, 555, 642

[56] References Cited

U.S. PATENT DOCUMENTS

| | | | |
|---|---|---|---|
| 3,864,458 | 2/1975 | Roberts | 423/481 |
| 4,010,245 | 3/1977 | Spreckelmeyer et al. | 423/485 |
| 4,120,939 | 10/1978 | Ehlig | 423/485 |
| 4,301,137 | 11/1981 | Williams et al. | 423/481 |
| 4,310,501 | 1/1982 | Reh et al. | 423/485 |
| 4,462,976 | 7/1984 | Karger | 423/555 |
| 4,462,976 | 7/1984 | Karger | 423/178 |
| 4,478,810 | 10/1984 | Bloss et al. | 423/555 |
| 4,495,162 | 12/1985 | Jons et al. | 423/162 |
| 4,544,542 | 10/1985 | Angevine et al. | 423/555 |
| 4,595,576 | 1/1986 | Andreasen et al. | 423/558 |
| 4,666,694 | 5/1987 | Jons et al. | 423/694 |

OTHER PUBLICATIONS

Mellor, J. W. A Comprehensive Throatise on Inorganic and Theoretical Chemistry vol. 2 pp. 5, 162, 163, 164 Longmans Green & Co., London England 1946.

*Primary Examiner*—Gary P. Straub
*Attorney, Agent, or Firm*—Darby & Darby

[57] ABSTRACT

Disclosed herein is a method for producing plasters that contain chloride contents of less than 0.5% by weight from calcium-containing impure products or residues having a high chloride content (e.g., about 10% or higher based on the total product or residue weight). The method does not require the addition of fly ash, $SiO_2$ or $Al_2O_3$. The method comprises temperature and water-mediated conversion of calcium chloride to calcium oxide in the calcium-containing product or residue using water, steam and/or substances that generate water to obtain calcium oxide and hydrochloric acid; and sulfating calcium components in the product or residue using oxygen and sulfur-containing, largely calcium-free substances. The product so obtained is an anhydride plaster which can optionally be hydrated.

20 Claims, 2 Drawing Sheets

METHOD FOR THE PREPARATION OF LOW-CHLORIDE PLASTER PRODUCTS FROM CALCIUM-CONTAINING RESIDUES OF FLUE-GAS PURIFICATION PLANTS

This is a continuation of application Ser. No. 514,004, filed Apr. 25, 1990, now abandoned.

FIELD OF THE INVENTION

The present invention relates to the production of plaster products. More particularly, the present invention relates to a method of producing low-chloride plaster products.

BACKGROUND OF THE INVENTION

The present invention relates to a method for producing low-chloride plaster products from impure products or residues, which contain calcium and/or calcium compounds, such as sulfites, chlorides, sulfates, hydroxides, carbonates and/or oxides of calcium or mixtures thereof.

Calcium-containing residues are formed, for example, during the removal of sulfur dioxide ($SO_2$) and other environmentally harmful components from flue-gases or waste gases of coal-fired plants, combustion plants or remelting plants. Methods for the thermal conversion of such residues into plaster products by oxidation and calcining are known. However, residues with high calcium chloride content cannot be processed into high-grade, low-chloride plaster products using known methods. High-grade, low-chloride plasters are useful, for example, in the building industry in the manufacture of calcium sulfite anhydrate for building cement and retarders.

Some calcium-containing residues, such as the spray absorption residues from dry flue-gas purification plants, have $CaCl_2$ contents of up to 10% by weight. Spray-absorption residues originate from dry or quasi-dry desulfurization installations, which are operated with lime as an absorbent. A method to produce low-chloride anhydrous plaster from such residues is disclosed in U.S. Pat. No. 4,495,162 (European Patent 0,074,772.) The method disclosed in the '162 patent includes the oxidation of a $CaSO_3$ component of the residue to $CaSO_4$ (calcium anhydrite). Then, in a separate step, chlorine is removed by exposing the residue to steam at temperatures between 600° and 950° C. To achieve a low chloride content in the product manufactured by this method, large quantities of fly ash or materials containing $SiO_2$ and $Al_2O_3$ are required. Addition of these materials functions to bind the calcium chloride ($CaCl_2$) components as calcium silicate or calcium aluminate. This is said to facilitate the reaction of the chlorine liberated from the residue and water (steam) to form gaseous HCl.

Despite the availability of this process, plaster products having chloride contents of less than 0.5% by weight are produced only at temperatures well in excess of 600° C. A further disadvantage of this method is the resulting high proportion of silicate and aluminate in the end product.

It is an object of the present invention to provide an effective method for processing calcium-containing impure products or residues to form low-chloride plaster having a calcium chloride content below 0.5% by weight.

Another object of the present invention is to provide a method for making low-chloride plasters from calcium containing residues that contain up to 10% by weight of $CaCl_2$ at temperatures between 500° C. and 600° C.

A further object of the present invention is to provide a process for making high grade plaster products containing less than 0.5% by weight of chlorine from calcium containing waste materials containing up to 10% by weight of $CaCl_2$, that is not dependent on the quantity of fly ash, $SiO_2$ or $Al_2O_3$ that is present in the starting material.

A still further object of the invention is to produce low-chloride plaster in either anhydrous form or in a partially hydrated form (beta-hemihydrate form).

These and other objects of the present invention will be apparent to those of ordinary skill in the art in light of the following description, drawings and claims.

SUMMARY OF THE INVENTION

Figure 1:
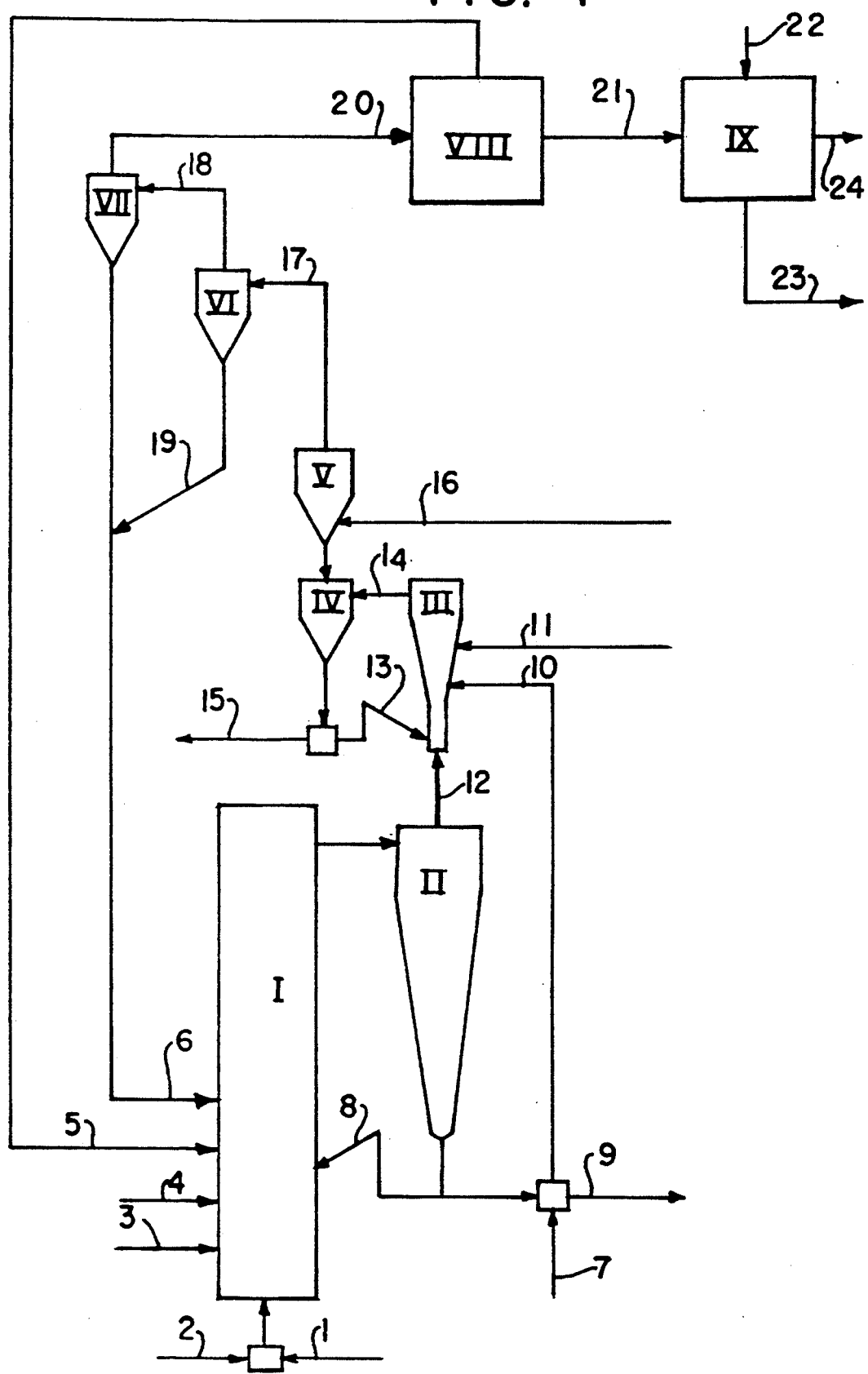
FIG. 1 is a schematic diagram of a plant used with the method of the present invention for producing either anhydrous or plaster.

The present invention provides a method for producing high grade plaster products having less than 0.5% by weight of chloride materials from a calcium-containing starting material having a $CaCl_2$ content of up to 10% by weight.

In another embodiment, the invention provides a method for heating anhydrous plaster to form a hydrated plaster product by hydrating the anhydrous plaster by addition of water, steam and/or plaster-containing substances that split off water in an effective amount for the hydration of the plaster, and obtaining a partially hydrated plaster with ½ molecule of $H_2O$ per molecule of $CaSO_4$.

DETAILED DESCRIPTION

The inventors have discovered that the processing of calcium-containing waste materials or residues by oxidation and water-mediated conversion of calcium chloride to calcium oxide to produce plasters can be improved by the addition of sulfur-containing substances to the reactor used for the process. In the presence of oxygen these sulfur-containing substances should be capable of donating sulfur to calcium residues to form sulfites or sulfates. Examples of such sulfur-containing substances are residue sulfuric acids. This sulfation reaction results in raising the temperature at which sintering begins to occur to a substantially higher value, approximately 650° C. This makes it possible to conduct the plaster manufacture method at temperatures in excess of 500° C. without being hindered by the occurrence of interfering sintering processes. Consequently, the efficiency of the method for manufacturing plaster is substantially increased.

A low chloride plaster is defined for the purposes of the present invention as one having a chloride content of less than 0.5% by weight.

During the oxidation of high chloride, calcium-containing residues in the presence of $O_2$ and at elevated temperature, the following reactions take place:

| | | | |
|---|---|---|---|
| (a) | $2CaSO_3 + O_2$ | = | $2CaSO_4$ |
| (b) | $Ca(OH)_2$ | = | $CaO + H_2O$ |
| (c) | $CaCO_3$ | = | $CaO + CO_2$ |
| (d) | $CaCl_2 + H_2O$ | = | $CaO + 2HCl$ |

Problems are encountered using this basic process since even at temperatures as low as 450° C., low melting phases of calcium form among the reacting materials. Especially susceptible to these melting processes are the $CaCl_2$ and CaO components. This leads to sintering processes between solid particles, resulting in agglomeration of such particles and, a loss of surface area, that greatly impedes or blocks further reaction of the component molecules. Thus, the product obtained will contain undesirably high levels of $CaSO_3$, $CaCl_2$ and CaO. The present invention, on the other hand can tolerate very high levels of these components: e.g., up to 100% $CaSO_3$; 10% $CaCl_2$ and 100% CaO.

Without the present invention, these sintering processes are difficult to avoid because temperatures below 500° C. are not adequate for the oxidation reactions and for reaction (d) (water-mediated conversion of $CaCl_2$ to CaO) to go to completion.

Another process that interferes with the manufacture of low chloride plaster is caking and adhering of the starting material to the walls of the reaction vessel. Thus, furnace units such as rotary furnaces or simple fluidized bed furnaces that do not recirculate solids are not preferred due to the tendency for such caking to occur in these furnaces. Uniform temperatures are also difficult to obtain with these types of furnaces. Even a circulating fluidized bed furnace, which has excellent mixing and heat transfer properties due to high gas flow rates and is able to attain a high degree of particle suspension, is not sufficient to produce a low chloride and low sulfite plaster product by the above described processes.

The method of the present invention starts with calcium-containing products or residues, of the type that are byproducts of several industrial processes. Such industrial processes include: dry waste gas purification, waste water treatment (lime sludges) and neutralization processes. Sulfur-containing substances (available from several sources, e.g., waste from industrial processes such as waste acid from aluminum anodizing or pickling acid wastes) are added to the calcium containing products in a stoichiometry of between about 1.0 to 1.2 of sulfur to calcium salts (that can form CaO during the course of the process). These materials are heated to a temperature of between about 500° C. and about 650° C. in the presence of substantial molar excess of $O_2$ and molar amounts of $H_2O$ (or substances that generate molar amounts of $H_2O$) that are greater than or equal to the molar amount of $CaCl_2$ in the residue. For the purpose of describing the present invention, a substantial excess of $O_2$ shall mean at least about 1.5 times the stoichiometric amount of $O_2$ required to convert the sulfur components of the calcium-containing products or residues and any sulfur-containing substances to the sulfate form. The minimum ratio of $O_2$ to oxidizable sulfur with which the invention can function to convert sulfur is 1.5. Performing these steps results in reactions (a)–(d), above. Additionally, the CaO formed by reactions (b)–(d) reacts with the sulfates that are derived from the sulfur-containing residues to form $CaSO_4$, which is resistant to melting in the temperature range 500° C.–650° C.

The product of the method is an anhydrous plaster containing less than 0.5% by weight of calcium chloride.

In the present invention preferred results are obtained by using a circulating fluidized bed furnace as the reactor vessel. Such a reactor acts to prevent caking the reactor walls and maintains a relative uniform furnace temperature. One preferred furnace is commercially available from Lurgi Corporation.

The water-mediated conversion of $CaCl_2$ to CaO (reaction (d), above) is made more efficient in the method of the present invention by taking advantage of the Law of Mass Action and removing one or more of the products of the forward reaction. The CaO product is removed by the sulfation reaction. The gaseous HCl product can be optionally removed by gas flow out of the reaction vessel. Thus, the forward reaction is more favored thermodynamically.

The gas flow can be provided by injecting an oxygen-containing gas, such as molecular oxygen or air, into the reactor vessel. The preferred gas flow rate is such that the residence time of gaseous materials in the reaction vessel is between about 2 seconds and about 4 seconds.

The temperature in the reaction vessel should not substantially exceed 650° C., because the undesirable sintering processes occur at and above this temperature.

In a subsequent process, the anhydrous plaster made according to the present invention can optionally be rehydrated to yield a low chloride, partially hydrated, plaster. The preferred temperature for the rehydration process is between about 150° C. and about 200° C. The water required for this rehydration can be provided directly as steam, or indirectly as substances that generate water when heated to between about 150° C. and about 200° C. An effective amount of water or of water-generating substances shall be an amount sufficient to yield a water content in the plaster product of about 4 to 6.2%. Such water-generating substances should be substantially free of impurities, i.e., less than about 1% by weight, since they will be incorporated into the product with little or no modification. Non-limiting examples of suitable water-generating substances are REA plaster (flue-gas desulfurizing plaster), chemical plaster dihydrate, the sulfur-containing substances described above, water of combustion from oil or natural gas used for heating the reactor, and water of crystallization.

The hydrating substance added (e.g. water, REA plaster or chemical plaster), can optionally serve to cool the waste gas coming from the circulating fluidized bed (for instance, when operating the present invention using the plant diagramed in FIG. 1).

Figure 2:
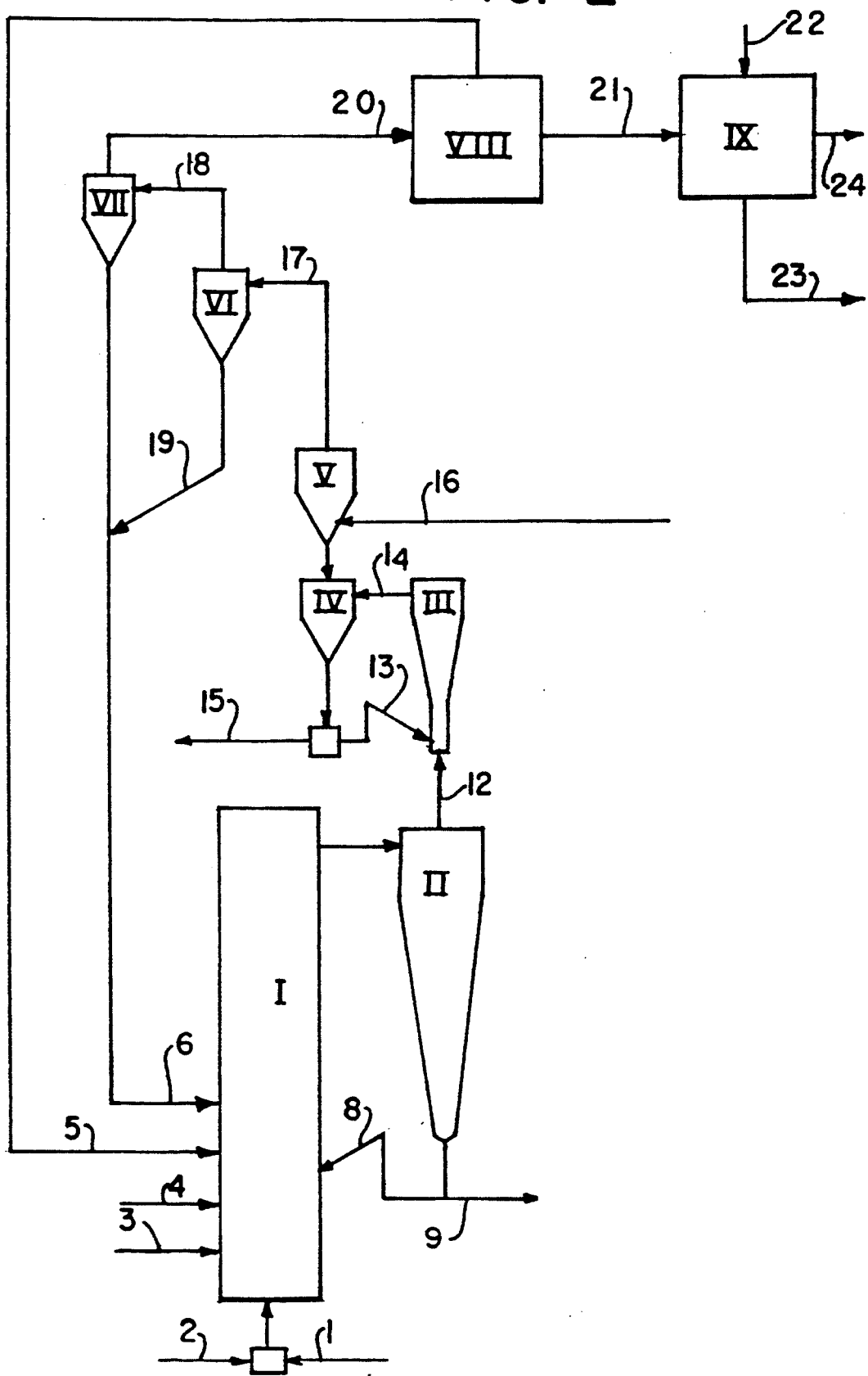
FIG. 2 is a schematic diagram of a plant used with the method of the present invention for producing an anhydrous plaster.

Both the basic plaster production technique and the rehydration method of the present invention can be carried out continuously, with constant removal of product either to an output vessel or to the vessel where rehydration is to be effected. Alternatively the process can be performed in a stepwise, sequential manner. FIGS. 1 and 2 represent a block diagram of a plant for producing low chloride plaster products on a continuous basis using the method of the present invention.

Oil-containing waste materials may be introduced into the reaction vessel as additional energy sources. This alternate fuel functions to provide a portion of the heat requirements of the process. Likewise, clays from used oil treatment plants and/or filter earth from rolling oil purification plants may be added as additional energy sources. The maximum amount of oil-containing waste materials is dependent on the energy balance of the circulating fluidized bed reactor and the maximum amount of impurities which may be tolerated in the final product.

Flowers of sulfur (sublimed sulfur) from power plant residues and/or sulfur containing waste acids such as sulfuric acid or sulfur-containing acids from anodizing baths may be used to sulfate the free CaO molecules that are present in the calcium-containing residue or that may be formed in such residue by the conversion processes described above. The amounts of these sulfur carriers added should be a near stoichiometric amount relative to the amount of CaO that can theoretically form during the course of the process. The waste acids can also be used to generate water for use in the water-mediated conversion of $CaCl_2$ to CaO.

A preferred embodiment of the invention uses a spray-absorption residue comprising:

| | | |
|---|---|---|
| $CaSO_3$ | — | 20–70% (by weight) |
| $CaCl_2$ | — | 2–10% (by weight) |
| $Ca(OH)_2$ | — | 2–30% (by weight) |
| $CaCO_3$ | — | 5–10% (by weight) |
| $CaSO_4$ | — | 5–10% (by weight) | as the calcium containing residue or starting material for practicing the present invention.

The process of the present invention can produce high grade plaster products with low chloride contents of less than 0.5% by weight chloride content, even if the starting material contains $CaCl_2$ in amounts up to 10%. The method works at relatively low temperatures ranging from about 500° C. to about 650° C. The chloride content in the end product is independent of the fly-ash or $SiO_2/Al_2O_3$ content of the starting mixture. The method does not require the addition of fly-ash or $SiO_2/Al_2O_3$, and, consequently, the product can be substantially free of these components. Another advantage of the method is the ability to dispose of numerous waste materials without contaminating the environment.

FIG. 1 shows a schematic diagram of a plant that can produce anhydrous plaster or, optionally, beta-hemihydrate plaster using the process of the present invention.

The reactor (I) is fluidized with hot gas (inlet 1) and steam (inlet 2). Spray-absorption residues (inlet 3), sulfur-containing residues (inlet 4), filter dust (inlet 5) and cyclone dust (inlet 6) are caused to react in reactor (I) at a temperature of between about 500° and about 650° C. The recirculated solid material (inlet 8) is returned from the cyclone (II) to the reactor (I). The solids removed can be discharged as anhydrous product (outlet 9) or transported pneumatically with air (inlet 7) as material stream through conduit 10 into the rehydrating reactor vessel (III). This rehydrating reactor (III) is fluidized with dust-laden waste gas introduced via conduit 12 from the cyclone (II). Upon addition of steam (inlet 11), the anhydrous plaster reacts to form a beta hemihydrate plaster. The solid-laden waste gas is passed via conduit 14 from the rehydrating reactor (III) through the cyclone (IV), where the solid material is deposited and the non-recirculating solid is discharged (outlet 15) as hydrated product; the recirculated solid is returned via conduit 13 to the reactor (III). Water, REA plaster or chemical plaster dihydrate (inlet 16) is supplied to the reactor (III) by way of the venturi (V). By this procedure, the dust-laden waste gases circulating via conduits 14 and 17 are cooled at the same time. The solid streams are returned by way of the cyclone (VI) (and conduit 19) and cyclone (VII) (and conduit 6) to the reactor (I). In dust filter (VIII), the dust is removed from the dust-laden gas arriving via conduit 20, and the dust is returned to the reactor I as material stream (via inlet 5).

The HCl components are removed from the dust-free waste gas exiting (VIII) via conduit 21 in a dry gas purification section (IX) with the aid of an absorbent introduced via inlet 22, purified waste gas (outlet 24) and a residue (outlet 23), containing calcium chloride in a more concentrated form, are obtained.

FIG. 2 shows the slightly modified plant for producing only anhydrous plaster. The anhydrous plaster (outlet 9), removed from the recycling cyclone (II), is discharged completely as product. The dust-laden waste gas passing from (II) via conduit 12 is guided over the reactor (III) into the cyclone (IV). The solid is deposited here and returned to the reactor (I) via conduit 15. The other components correspond to those in FIG. 1.

The invention is further illustrated in the specific example set forth below which is intended to describe the invention without limiting its scope.

EXAMPLE 1

Starting and Final Compositions

A spray-absorption residue was processed at a temperature of 550° C. to an anhydrous plaster by a method similar to that diagrammed in FIG. 2, where the reactor was a circulating fluidized bed furnace. Steam and sulfuric acid were used as additives. The amounts added were such that sulfur was introduced in substantially stoichiometric proportion required to sulfate the calcium oxide present or formed during the process and water was introduced in about twice the stoichiometric proportion required to convert calcium chloride to calcium oxide. Under these conditions, a high-grade anhydrous plaster, containing about 0.5% sulfite and about 0.1% chloride, was produced with the method of the invention. The analysis of the starting material and the product are set forth in Table 1 in % by weight.

TABLE 1

| | Feed Material (Spray Absorption Residue) % by Weight | Product (Anhydrous) % by Weight | Product (beta-semi-hydrate) 5 by Weight |
|---|---|---|---|
| Moisture content at 45° C. | 0.5 | — | |
| Analysis in the Original Material: | | | |
| Loss on ignition at 360° C. | 8.1 | 0.1 | 6.0 |
| CaO-total | 58.4 | 39.7 | 37.3 |
| CaO-free | 13.3 | 0.1 | 0.1 |
| $SO_4$ | 6.8 | 67.4 | 63.4 |
| $SO_3$ | 26.8 | 0.5 | 0.5 |
| Cl | 2.6 | 0.1 | 0.1 |

What is claimed is:

1. A method for the production of low-chloride calcium-sulfate containing products, comprising the steps of;
   introducing a calcium-containing material comprising $CaCl_2$ and $CaSO_3$ into a reaction vessel, said calcium-containing material having a calcium chloride content of at least 2% and up to 10% by weight and a $CaSO_3$ content of at least 20% by weight;

supplying a reactive component, said reactive component comprising sulfuric acid or sulfuric acid precursors which will form the $SO_4$ radical; reacting the resultant mixture under the reaction conditions set forth below, in a quantity sufficient to convert said $CaCl_2$ to calcium sulfate under the following conditions;

at a temperature within the range of about 500° C. to about 650° C.;

in the presence of a sufficient molar excess of oxygen to convert all sulfur components present in the reaction vessel which are convertible to the sulfate oxidation state to the sulfate oxidation state;

in the presence of water vapor; and directly recovering a calcium sulfate anhydride-containing product containing less than 0.5% by weight of calcium chloride.

2. The method of claim 1 further comprising the steps of (a) introducing into the reaction vessel an energy source comprising an oil containing clay and (b) concurrently introducing into the reaction vessel sufficient oxygen to allow for the combustion of said oil in said clay.

3. The method of claim 1 wherein said calcium containing material is selected from the group consisting of calcium-containing material from dry and wet flue-gas desulfurization processes.

4. The method of claim 1 wherein said calcium-containing material is a spray-absorption residue including 20–70% by weight of $CaSO_3$, 2–10% by weight of $CaCl_2$, 2–30% by weight of $Ca(OH)_2$, 5–10% by weight of $CaCO_3$ and 5–10% by weight of $CaSO_4$.

5. The method of claim 1 wherein said reactive component is selected from the group consisting of sulfur, sulfur-containing waste acids and combinations thereof.

6. The method of claim 1 wherein a portion of said water vapor is obtained from a water-generating substance.

7. The method of claim 6 wherein the water-generating substance comprises one or more sulfur-containing waste acids.

8. The method of claim 1 wherein said reaction vessel is a circulating fluidized bed furnace.

9. The method of claim 8 wherein the average residence time of gaseous materials in the reaction vessel is between about 2 and about 4 seconds.

10. The method of claim 1, wherein said reduction of chloride occurs substantially independently of the presence of fly ash.

11. A method for the production of low-chloride calcium-sulfate containing products, comprising steps of;

introducing a calcium-containing material comprising $CaCl_2$ and $CaSO_3$ into a reaction vessel, said calcium-containing material having a calcium chloride content of at least 2% and up to 10% by weight and a $CaSO_3$ content of at least 20% by weight;

supplying a reactive component, said reactive component comprising sulfuric acid or sulfuric acid precursors which will form the $SO_4$ radical; reacting the resultant mixture under the reaction conditions set forth below, in a quantity sufficient to convert said $CaCl_2$ to calcium sulfate under the following conditions;

at a temperature within the range of about 500° C. to about 650° C.;

in the presence of a sufficient molar excess of oxygen to convert all sulfur components present in the reaction vessel which are convertible to the sulfate oxidation state to the sulfate oxidation state;

in the presence of water vapor;

directly recovering a calcium sulfate anhydride-containing product containing less than 0.5% by weight of calcium chloride; and subsequently hydrating said calcium sulfate anhydride product to obtain a semi-hydrated calcium sulfate-containing product.

12. The method of claim 11 further comprising the steps of (a) introducing into the reaction vessel an energy source comprising an oil containing clay and (b) concurrently introducing into the reaction vessel sufficient oxygen to allow for the combustion of said oil in said clay.

13. The method of claim 11 wherein said calcium containing material is selected from the group consisting of calcium-containing material from dry and wet flue-gas desulfurization processes.

14. The method of claim 11 wherein said calcium containing material is spray-absorption residue including 20–70% by weight $CaSO_3$, 2–10% by weight of $CaCl_2$, 2–30% by weight of $Ca(OH)_2$, 5–10% by weight of $CaCO_3$ and 5–10% by weight of $CaSO_4$.

15. The method of claim 11 wherein said reactive component is selected from the group consisting of sulfur, sulfur-containing waste acids and combinations thereof.

16. The method of claim 11 wherein a portion of said water vapor is obtained from a water-generating substance.

17. The method of claim 16 wherein the water generating substance is sulfur-containing waste acid.

18. The method of claim 11 wherein said reaction vessel is a circulating fluidized bed furnace.

19. The method of claim 18 wherein the average residence time of gaseous materials in the reaction vessel is between about 2 and about 4 seconds.

20. The method of claim 11 wherein said hydrating is conducted by adding a plaster-containing substance that generates water selected from the group consisting of flue-gas desulfurizing plaster (REA plaster), chemical plaster dihydrate from wet flue-gas purification plants, and combinations thereof.

* * * * *